United States Patent
Kreuzer

(10) Patent No.: US 7,172,213 B2
(45) Date of Patent: Feb. 6, 2007

(54) GAS BAG PROTECTION DEVICE

(75) Inventor: Martin Kreuzer, Kleinwallstadt (DE)

(73) Assignee: TRW AutomotiveSafety Systems GmbH, Aschaffenburg (DE)

(*) Notice: Subject to any disclaimer, the term of this patent is extended or adjusted under 35 U.S.C. 154(b) by 106 days.

(21) Appl. No.: 10/630,027

(22) Filed: Jul. 29, 2003

(65) Prior Publication Data

US 2004/0026911 A1   Feb. 12, 2004

(30) Foreign Application Priority Data

Aug. 9, 2002   (DE) ............................ 202 12 337 U

(51) Int. Cl.
*B60R 21/239* (2006.01)
(52) U.S. Cl. ...................... 280/739; 280/742
(58) Field of Classification Search ............... 280/731, 280/739, 743.1, 742, 750
See application file for complete search history.

(56) References Cited

U.S. PATENT DOCUMENTS

| | | | | |
|---|---|---|---|---|
| 3,758,133 A | * | 9/1973 | Okada | .................. 280/739 |
| 5,725,244 A | * | 3/1998 | Cundill | .................. 280/739 |
| 6,056,318 A | | 5/2000 | Braunschadel | |
| 6,139,048 A | * | 10/2000 | Braunschadel | ............ 280/728.1 |
| 6,322,099 B1 | | 11/2001 | Keeble | |
| 6,517,108 B1 | * | 2/2003 | Vinton et al. | .............. 280/739 |
| 6,692,021 B2 | * | 2/2004 | Amamori | .................. 280/739 |
| 2002/0125703 A1 | * | 9/2002 | Reiter et al. | ................ 280/739 |
| 2003/0020266 A1 | * | 1/2003 | Vendely et al. | ............. 280/739 |
| 2004/0130135 A1 | * | 7/2004 | Ekdahl | ........................ 280/739 |

FOREIGN PATENT DOCUMENTS

| | | |
|---|---|---|
| EP | 0917995 | 5/1999 |
| EP | 1022198 A1 | 7/2000 |
| GB | 2306409 | 5/1997 |
| JP | 6-286570 | 6/1994 |
| WO | 02/14115 | 2/2002 |

* cited by examiner

*Primary Examiner*—Paul Dickson
*Assistant Examiner*—Laura B. Rosenberg
(74) *Attorney, Agent, or Firm*—Tarolli, Sundheim, Covell & Tummino LLP

(57) ABSTRACT

A gas bag protection device comprises a gas bag which has an outer wall made of a first material. The outer wall has at least one outflow opening. A membrane made of an extensible, second material is provided which is fastened to the outer wall and covers the outflow opening in the not fully inflated state of the gas bag. The gas bag protection device further comprises a device provided outside the gas bag and serving for destroying the membrane. The gas bag and the device are arranged spaced so far apart from each other that the membrane meets the device only when a predetermined internal pressure of the gas bag has been reached.

16 Claims, 5 Drawing Sheets

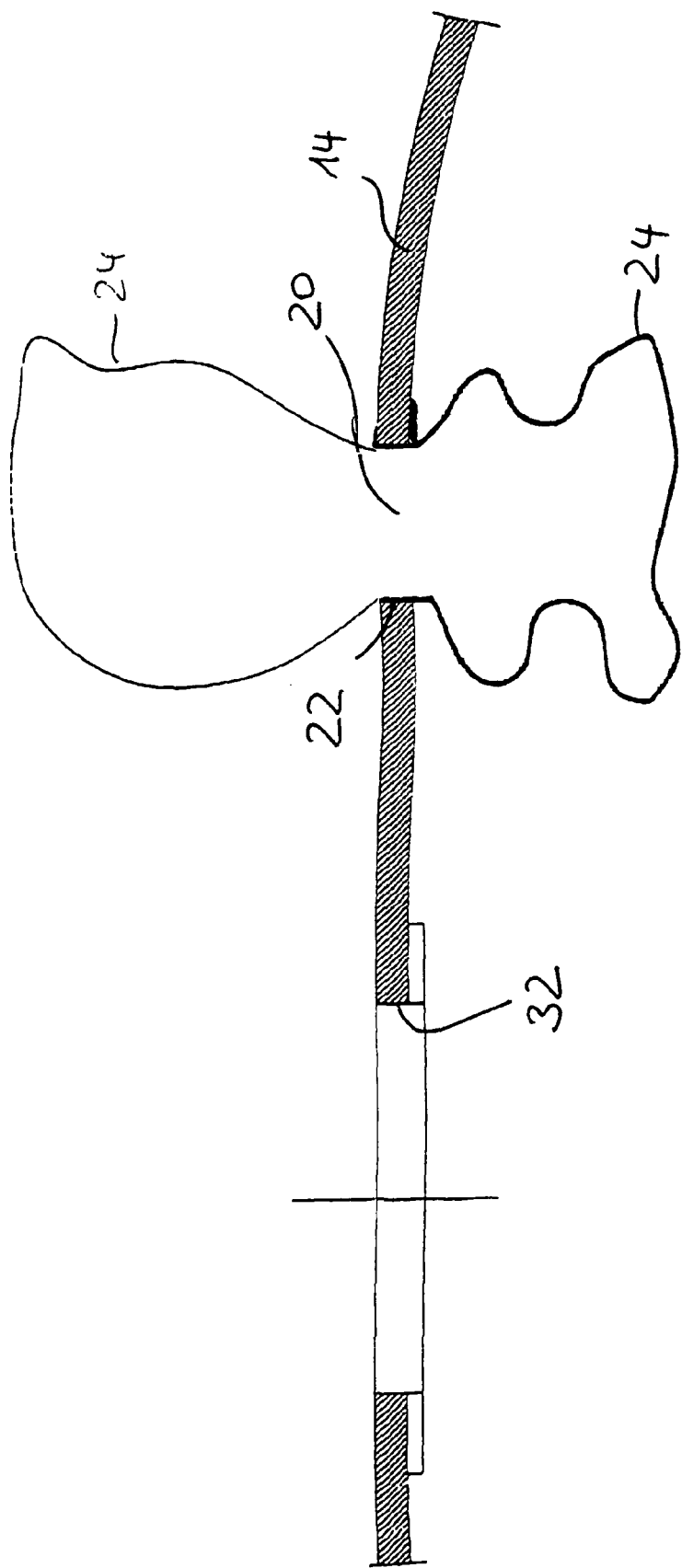

GAS BAG PROTECTION DEVICE

TECHNICAL FIELD

The invention relates to a gas bag protection device.

BACKGROUND OF THE INVENTION

Gas bags are to be inflated very quickly and subsequently, when the occupant plunges into them, are also to have a certain resilience. These two characteristics actually contradict each other. Therefore, valve-like outflow openings on the gas bag wall are proposed which allow gas to escape when a predetermined pressure has been reached.

The invention provides a gas bag protection device comprising a gas bag in which the controlling of the internal pressure of the gas bag takes place dependent on load, in so far as firstly only a small relief of the gas bag internal pressure takes place, to subsequently adapt the internal pressure in a controlled manner with increasing depth of plunging of the occupant into the gas bag, and finally even permit an escape of the gas after a specified pressure.

BRIEF SUMMARY OF THE INVENTION

According to the invention, a gas bag protection device comprises a gas bag which has an outer wall made of a first material. The outer wall has at least one outflow opening. A membrane made of an extensible, second material is provided which is fastened to the outer wall and covers the outflow opening in the not fully inflated state of the gas bag. The gas bag protection device further comprises a device provided outside the gas bag and serving for destroying the membrane. The gas bag and the device are arranged spaced so far apart from each other that the membrane meets the device only when a predetermined internal pressure of the gas bag has been reached. In the gas bag protection device according to the invention, before the membrane is destroyed and a large outflow opening is available, firstly the internal pressure is slightly reduced in that the membrane expands and a greater volume is available. This allows the membrane to act for example as an elastic balloon attached to the outflow opening, which provides an additional, variable volume. The internal pressure can adapt itself here to the stress from the exterior in a certain respect. Only after reaching a particular, very high pressure does the membrane meet the device, in order to be destroyed.

An embodiment of the invention makes provision that the membrane bulges forwards towards the exterior like a balloon before reaching the device.

In the folded state of the gas bag, the membrane may, however, be arranged inside the gas bag and turn outwards through the outlet opening during unfolding. With this, the membrane which is more sensitive than the outer wall, is protected when installed into a module housing, for example. Furthermore, as long as the membrane is not turned outwards through the outflow opening, it is not appreciably expanded, so that a volume of the gas bag which is only defined by the outer wall is available in the initial inflation phase, which accelerates the inflation process. Only later, when the gas bag has become so far inflated that it exerts a restraining effect, can the membrane then come into operation by turning outwards.

The material of the membrane is selected such that in the destroyed state it defines the effective outflow cross-section, which means it is not completely destroyed, but rather a ring-like section still remains for example in the region of the outflow opening, which constricts the outflow opening and thus alters the effective outflow cross-section as a function of load, preferably altering it in a reversible manner.

This can be achieved for example in that the membrane in the destroyed state is so extensible that it enlarges or reduces the effective outflow cross-section as a function of the internal pressure.

Preferably, the device for destroying the membrane is provided on the inner side of a vehicle steering wheel, for example by being constructed as a type of spike.

BRIEF DESCRIPTION OF THE DRAWINGS

FIG. 4 shows a view corresponding to FIG. 1 with the gas bag protection device with the membrane destroyed and FIG. 5 shows an enlarged sectional view of the gas bag used in the gas bag protection device according to the invention, in the region of the outflow opening.

DETAILED DESCRIPTION OF THE PREFERRED EMBODIMENT

Figure 1:
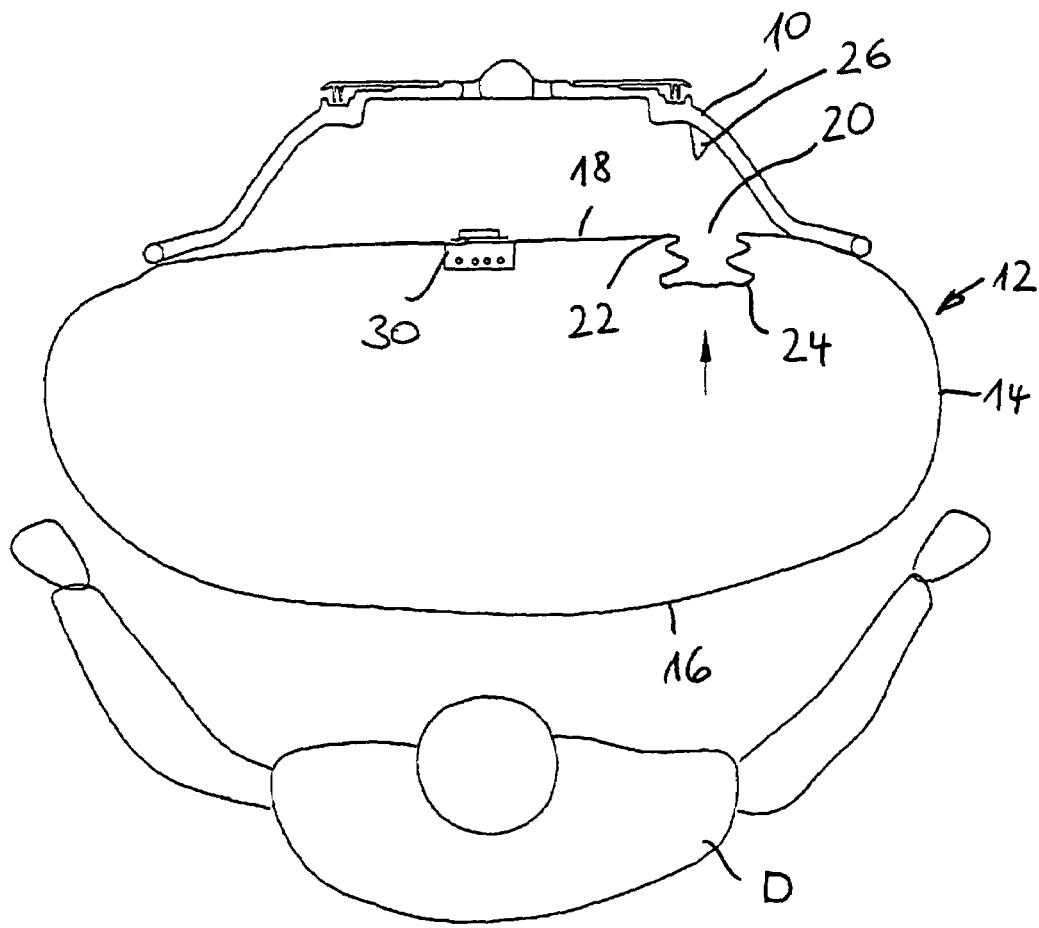
FIG. 1 shows a top view onto the vehicle interior in the region of the driver, which shows the gas bag protection device according to the invention before the driver has plunged in and in the almost fully inflated state.

In FIG. 1 a gas bag protection device is illustrated for the driver D of a vehicle. The protection device is fully integrated into a steering wheel 10 and comprises a gas bag 12 with an outer wall 14 made of fabric material, which has a front face 16 facing the occupant D and a rear face 18 facing the steering wheel 10. In the region of the rear face 18, the outer wall 14 has at least one outflow opening 20. On the edge 22 of the outflow opening 20, a balloon-like membrane 24 of extensible, preferably elastomeric material is fastened, which in the state shown in FIG. 1 covers and closes the outflow opening 20.

Also belonging to the protection device is a device 26 for destroying the membrane 24, which has the form of a spike-like extension facing the rear face 18, and which is provided on the inner face of the steering wheel 10, for example in the region of the transition of a spoke to the hub. The device 26 may, for example, be an extension of the steering wheel skeleton.

In the region of the so-called inflation orifice of the gas bag 12, a gas generator 30 projects into its interior. The inflation orifice is provided in FIG. 5 with the reference number 32.

It can also be seen in FIG. 5 that the membrane 24 in the region of the edge 22 projects into the interior of the outflow opening 20 and, as indicated on the right-hand side, may also have a section which lies on the inner side against the outer wall 14 and is fastened there. The region of the membrane 24, which is directly fastened to the outer wall 14, is closed in a ring shape.

FIG. 1 shows a state of the gas bag 12 when the latter is almost fully inflated and unfolded. The occupant D, however, has not yet plunged into the gas bag 12. In this state, the membrane 24 is still arranged inwards of the outflow opening 20 and seals off the interior of the gas bag.

Figure 2:
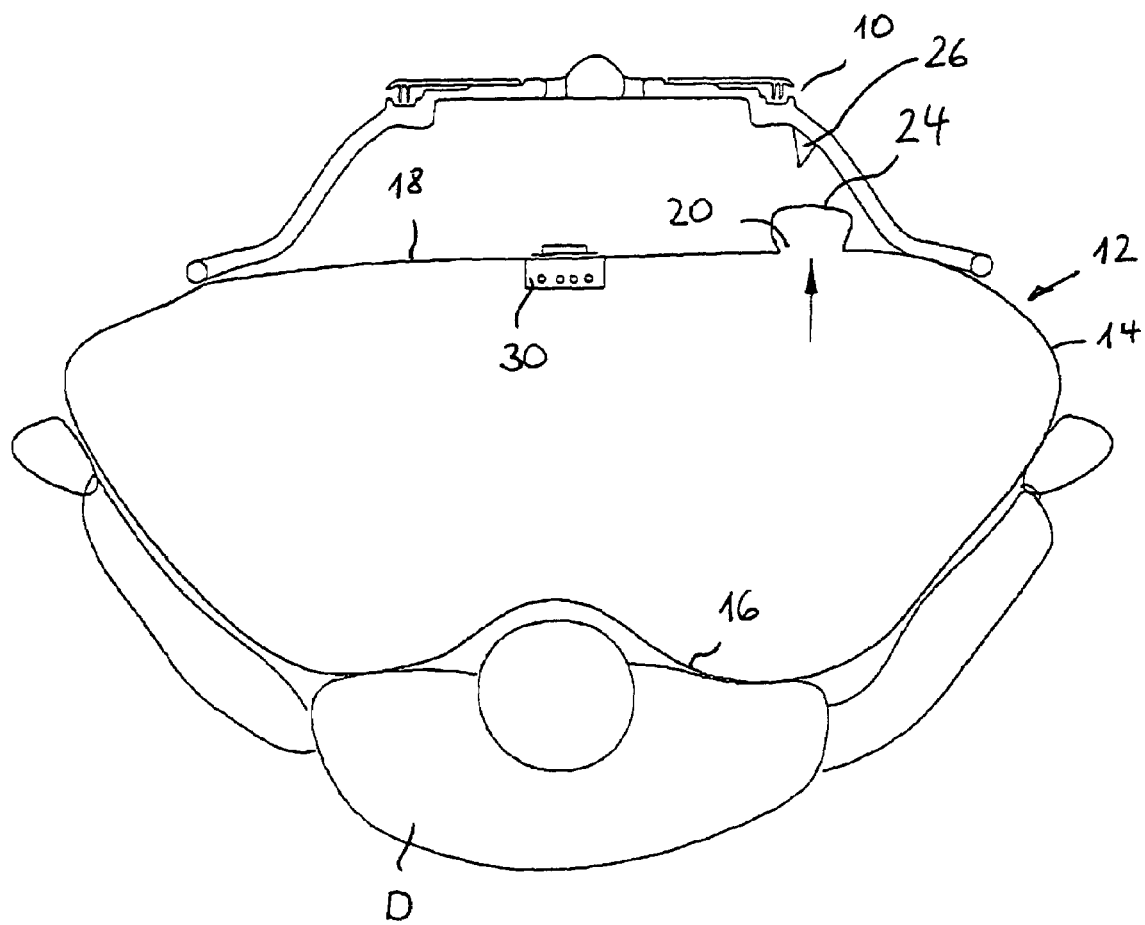
FIG. 2 shows a view corresponding to FIG. 1 with the gas bag protection device at the start of the plunging process of the occupant.
Figure 3:
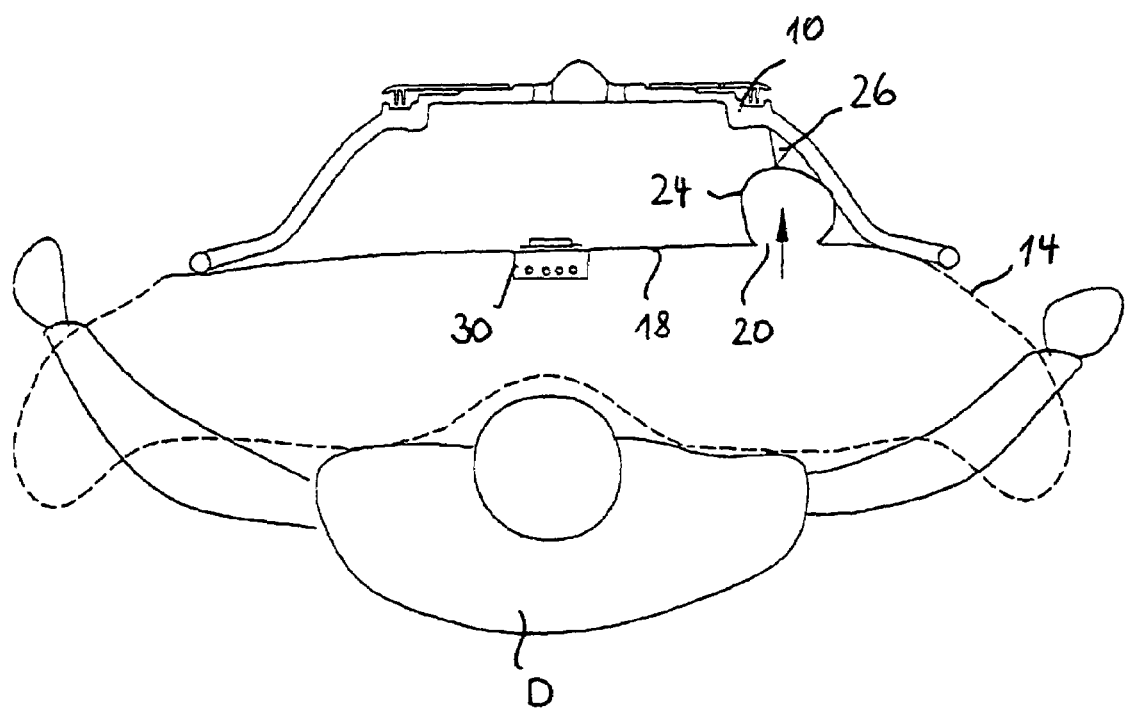
FIG. 3 shows a view corresponding to FIG. 1 with the gas bag protection device with an occupant who has plunged in further, shortly before the destruction of the membrane.

When the occupant begins to plunge into the gas bag (FIG. 2), the internal pressure of the gas bag increases and the membrane 24 turns outwards through the outflow opening 20. Thereby, the gas bag is given a greater volume and the internal pressure can decrease slightly.

Figure 4:
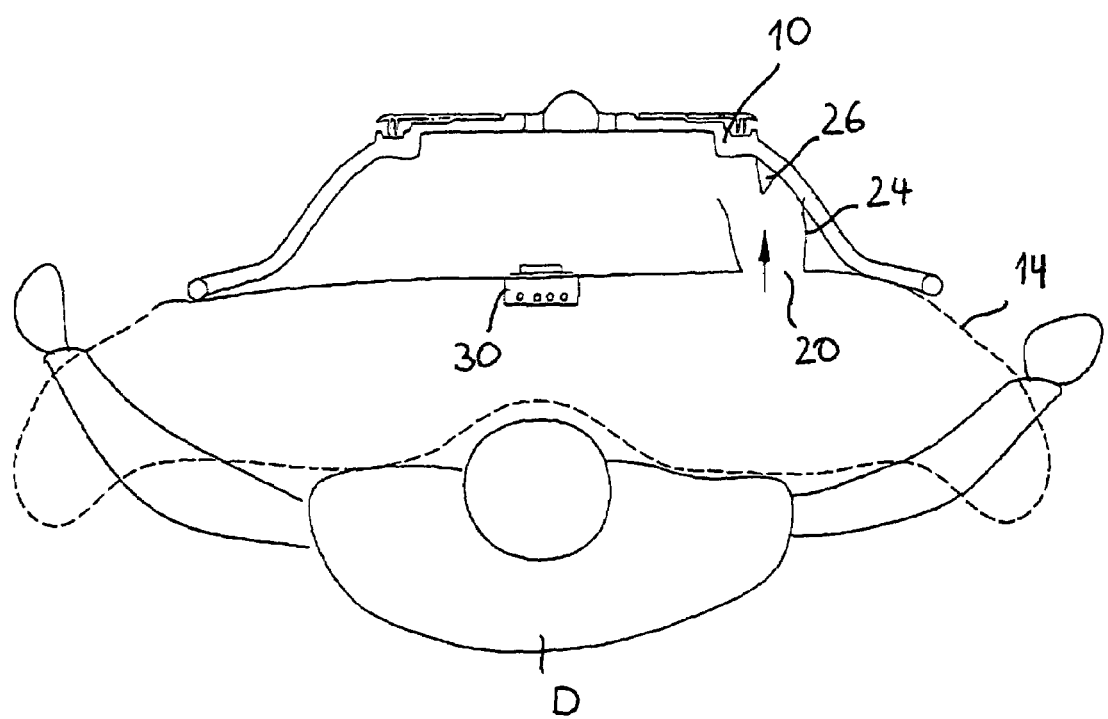

When the driver D plunges deeper into the gas bag 12, the internal pressure of the gas bag increases and the membrane bulges further forward toward the exterior like a balloon, so that a certain pressure equalization space is available. The membrane 24 comes closer to the device 26 and is finally destroyed (FIG. 4). This state corresponds to a certain maximum gas bag internal pressure, which can be predetermined.

In the destroyed state of the membrane, the latter can still have influence on the effective outflow cross-section, if applicable, in fact increase or decrease it as a function of the internal pressure. This would be possible for example when the membrane 24 remains undestroyed in the region of its fastening to the outer wall 14 and acts like a closed ring of elastomeric material which can also constrict the outflow opening 20.

The above-mentioned advantages can also be achieved when the membrane 24 is not fastened to the gas bag wall, but rather, for example, in a gas bag module housing on its rear wall in the region of a rear outflow opening on the housing side. In this embodiment, the rear face 18 of the gas bag is, as it were, replaced by the accommodation housing for the gas bag 12.

The invention claimed is:

1. A gas bag protection device comprising:
a gas bag which has an outer wall defining an inflatable volume, said outer wall being made of a first material; said outer wall having at least one outflow opening;
a membrane made of an extensible, second material which is fastened to said outer wall and covers said outflow opening in a not fully inflated state of said gas bag; and a device provided outside said gas bag and serving for destroying said membrane; said gas bag and said device being arranged spaced apart from each other such that said membrane meets said device only when a predetermined internal pressure of said gas bag has been reached; wherein said membrane is arranged inside said gas bag volume and bulges outwards through said outflow opening before reaching said device, wherein said membrane defines a recess that extends inwardly of said gas bag from said outflow opening prior to inflation of said gas bag, said recess of said membrane having a pair of side walls that face each other and extend inwardly from said outflow opening.

2. The gas bag protection device according to claim 1, wherein said membrane in a folded state of said gas bag is arranged inside said gas bag and turns outwards through said outflow opening on inflation of said gas bag.

3. The gas bag protection device according to claim 1, wherein said second material of said membrane is constructed such that in a destroyed state said membrane defines an effective outflow cross-section.

4. The gas bag protection device according to claim 3, wherein said membrane in said destroyed state is so extensible that said membrane provides for one of an enlargement and reduction of said effective outflow cross-section as a function of an internal pressure in said gas bag.

5. The gas bag protection device according to claim 1, wherein said device for destroying said membrane is provided on an inner face of a steering wheel.

6. The gas bag protection device according to claim 1, wherein said first material and said membrane define said inflatable volume of said gas bag, said inflatable volume of said gas bag increases when said membrane bulges through said outflow opening.

7. The gas bag protection device according to claim 1, wherein said membrane is made of an elastic material.

8. The gas bag protection device according to claim 1, wherein said first material and said membrane define said inflatable volume of said gas bag.

9. The gas bag protection device according to claim 8, wherein the inflatable volume defined by the first material and said membrane varies depending upon the load being applied to said gas bag.

10. The gas bag protection device according to claim 9, wherein said membrane in a folded state of said gas bag is arranged inside said gas bag and turns outwards through said outflow opening on inflation of said gas bag.

11. The gas bag protection device according to claim 8, wherein said outflow opening is covered only by said membrane.

12. The gas bag protection device according to claim 8 wherein said membrane is made of an elastomeric material.

13. The gas bag protection device according to claim 1, wherein said outflow opening is covered only by said membrane.

14. The gas bag protection device according to claim 1, wherein all of said gas bag remains rearward from said device when said membrane is destroyed by said device.

15. The gas bag protection device according to claim 1, wherein said membrane bulges outward through said outflow opening before reaching said device to increase the volume of said gas bag and reduce the pressure in said gas bag.

16. The gas bag protection device according to claim 1, wherein said membrane bulges outwards through said outflow opening before directly reaching said device, thereby giving the gas bag a greater volume.

* * * * *